G. C. BROWN.
POWER TRANSMISSION DEVICE.
APPLICATION FILED JUNE 28, 1915.
1,212,896.
Patented Jan. 16, 1917.
3 SHEETS—SHEET 1.
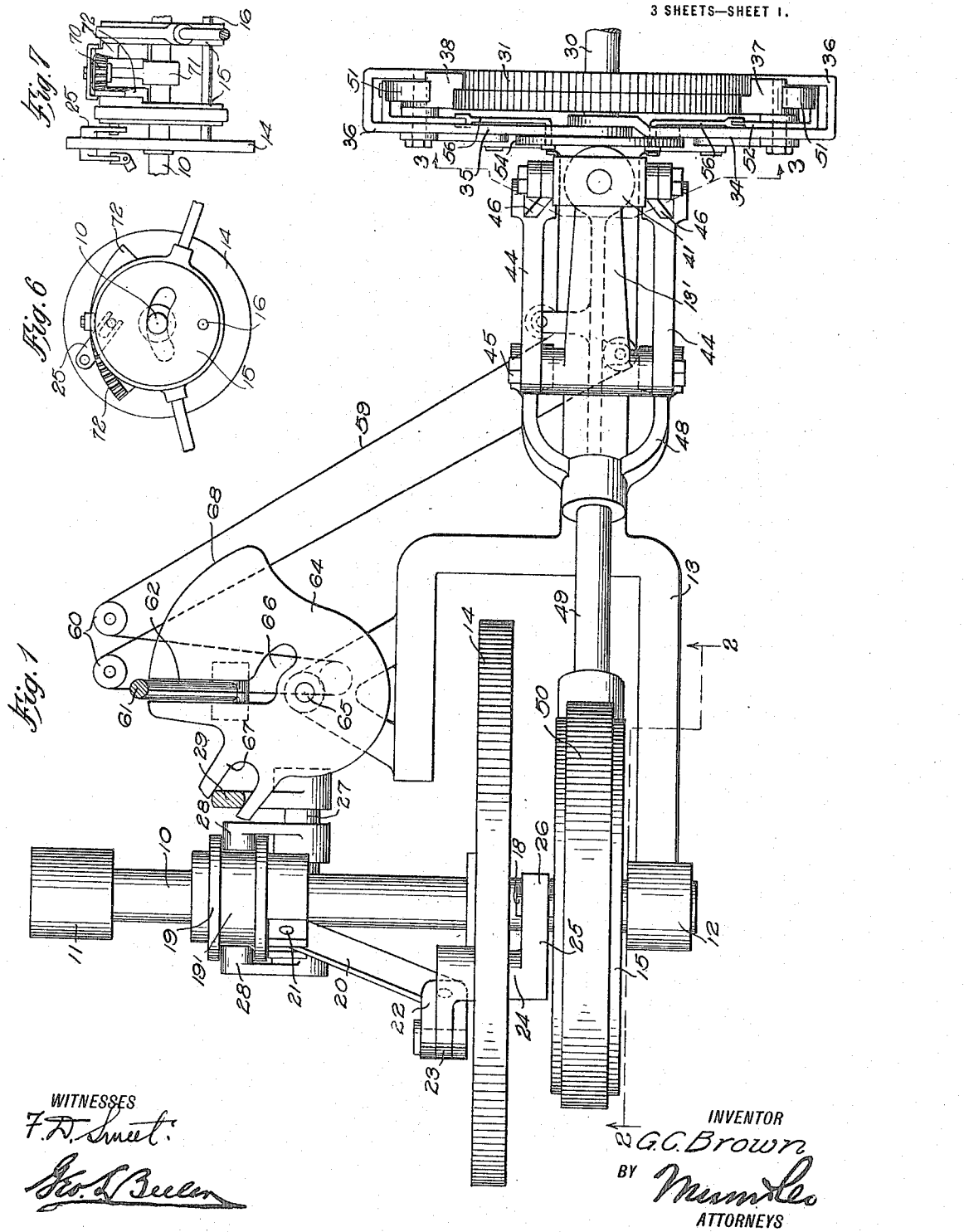
WITNESSES
F. D. Sweet
Geo. L. Beeler
INVENTOR
G. C. Brown
BY
ATTORNEYS

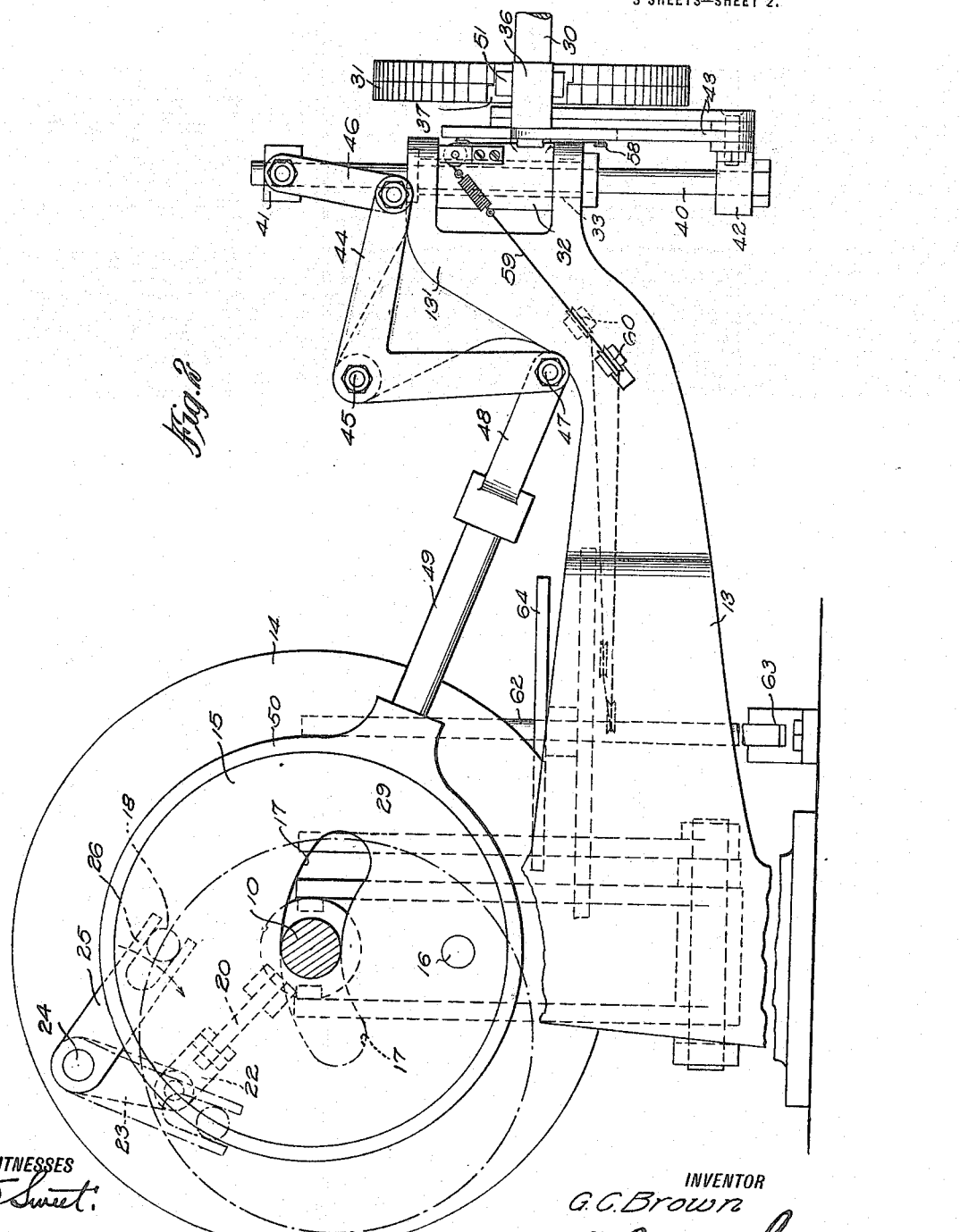

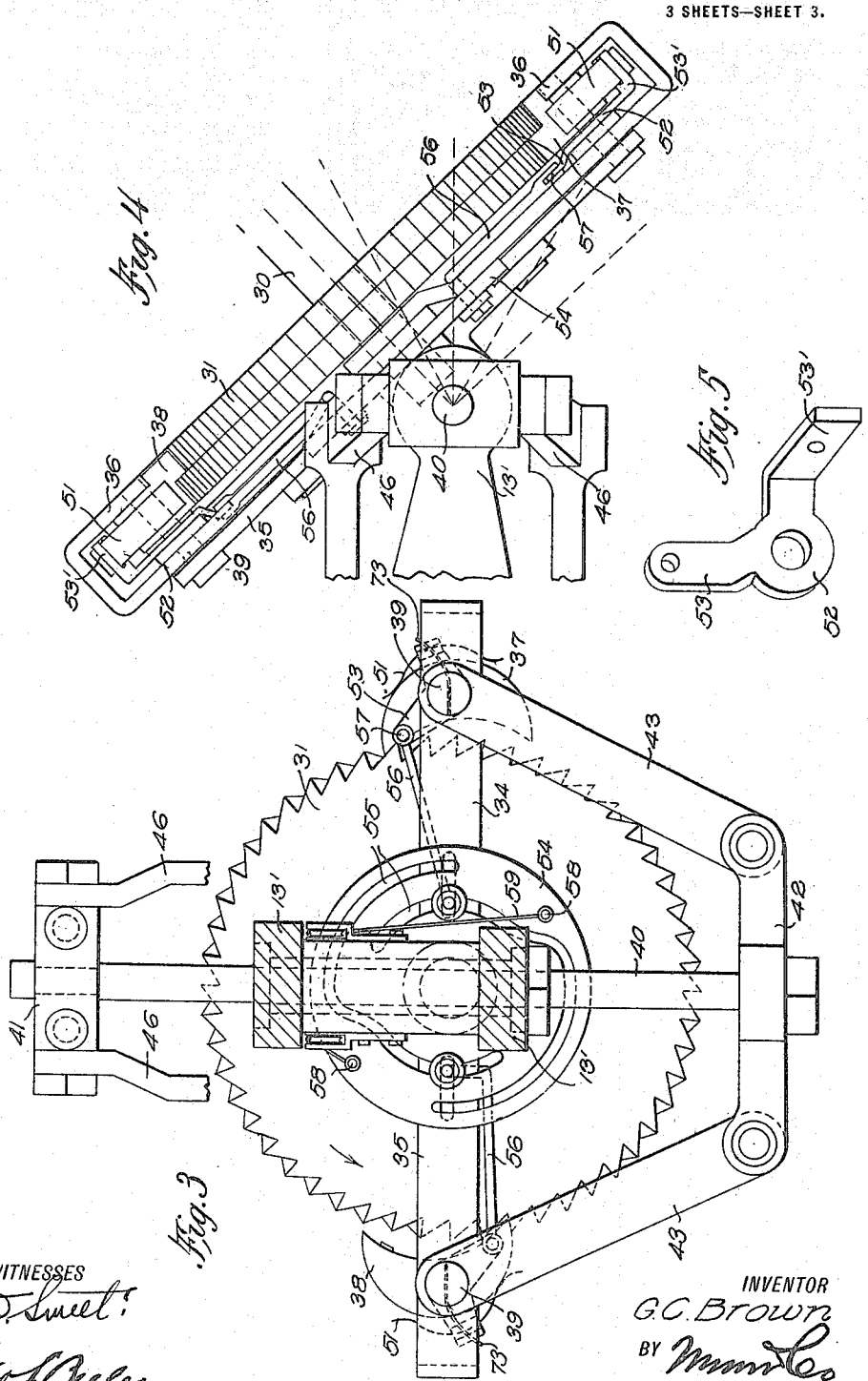

UNITED STATES PATENT OFFICE.

GLENN C. BROWN, OF NASHVILLE, TENNESSEE.

POWER-TRANSMISSION DEVICE.

1,212,896. Specification of Letters Patent. Patented Jan. 16, 1917.

Application filed June 28, 1915. Serial No. 36,699.

*To all whom it may concern:*

Be it known that I, GLENN C. BROWN, a citizen of the United States, and a resident of Nashville, in the county of Davidson and State of Tennessee, have invented a new and Improved Power-Transmitting Device, of which the following is a full, clear, and exact description.

This invention relates to machine elements or mechanical movements and has particular reference to power transmitting devices.

Among the objects of the invention is to provide a means whereby power may be transmitted from a prime mover to a driven shaft with devices for rotating the driven shaft in either direction at any desired speed and while in any desired angular position with respect to the prime mover.

Another object of the invention is to combine with a motor shaft adapted to rotate in a certain direction at a constant speed, a driven shaft, intermittent grip devices associated with the driven shaft, and means including a cam associated with the motor shaft for oscillating the intermittent grip devices through varying amplitudes.

A still further object of the invention is to provide in a mechanism of the character set forth a driven shaft, right and left ratchet wheels connected to the shaft, reversible pawl mechanism adapted to actuate either of the ratchet wheels, means to vary the amplitude or throw of the pawl mechanism, and locking devices for the pawl shifting means whereby the pawl or intermittent grip devices must be adjusted to neutral position preliminary to the change from one direction to the other.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a plan view of the main parts of the invention; Fig. 2 is a side elevation of the same, parts being in section substantially on the line 2—2 of Fig. 1; Fig. 3 is a vertical transverse section substantially on the irregular line 3—3 of Fig. 1; Fig. 4 is a plan view of the ratchet mechanism indicating the adaptability thereof for pivotal adjustment with respect to the driving mechanism; Fig. 5 is a detail of a part of the ratchet mechanism described below; Fig. 6 is a side elevation of a modified form of cam actuating devices; and Fig. 7 is an edge view of the same.

Referring more particularly to the drawings, I show a driving shaft 10 which may be understood as being mounted in fixed bearings 11 and 12 with respect to any machine adapted to be driven in any suitable manner, the power shaft 10, however, being understood to be adapted for rotation in a definite direction at substantially uniform speed. At 13 I show a fragment of a frame or bracket for supporting the operating parts.

14 indicates a plate or disk keyed or otherwise rigidly secured concentrically upon the shaft 10 and hence rotatable therewith. This in some instances may be employed as a fly wheel.

Adjacent the plate 14 is an eccentric 15 mounted upon a pivot 16 consisting of a pin or bolt carried by the plate 14 and parallel to the axis of the shaft 10. The eccentric 15 is provided with an opening 17 of any suitable size or form but shown in the nature of an arc-shaped slot concentric with the pivot 16 and through which the shaft 10 extends and whereby the eccentric 15 may be adjusted with the shaft at its center or with the shaft at any desired distance eccentrically of the center toward the other end of the slot. At 18 is shown a stud extending from one side of the eccentric preferably diametrically opposite from the pivot 16.

19 indicates a collar loosely and slidably mounted upon the shaft 10 and having a link 20 connected at one end at 21 to the collar and at its other end at 22 to a knuckle pivoted to one arm 23 of a bell crank whose axis 24 is journaled in the plate 14 parallel to the main shaft and carrying at its other end an arm 25 having a fork 26 at its free end coöperating with the stud 18. When the collar 19 is forced along the shaft toward the plate 14, the link 20 causes the knuckle 22 to be thrown outwardly radially from the center of the shaft 10 causing the bell crank to carry the stud 18 and eccentric bodily laterally of the shaft and around the axis of the pivot 16, as shown by the dot and dash lines in Fig. 2, thereby adjusting the eccentric disk member 15 into a true eccentric position with respect to the shaft and plate 14. As a suitable means for controlling the position of the collar 19 I provide a rock shaft 27 having a pair of arms 28 constituting a fork coöperating with the groove 19' of the collar and to which rock shaft a lever 29 is connected. This lever indicates a suitable means for rotating the rock shaft in its bearings and holding the fork 28 at any desired adjustment longitudinally of the shaft. When the collar 19 is in the position shown in Fig. 1, or at the farthest point from the plate 14, the eccentric 15 will be disposed, as shown in full lines in Fig. 2, concentric with the shaft, but when the lever 29 is thrown toward the plate 14, bringing the collar 19 close to the plate, the eccentric will be thrown to the position shown in dot and dash lines in Fig. 2, and in this position the link 20 will stand substantially parallel to the plate 14 tending to lock the eccentric from movement back toward the concentric position and in this position the eccentric will have its greatest eccentricity and will give a maximum throw.

At 30 I indicate a driven shaft to which is connected a double or right and left ratchet wheel 31. One end of the driven shaft 30 is journaled or swiveled in a knuckle 32 pivoted on a vertical axis in a sleeve or bushing 33 mounted in the fork 13' of the frame and hence adapted to swing laterally around the axis of the sleeve without interference with the free rotation of the shaft.

34 and 35 indicate a pair of arms overlapping each other and journaled at their adjacent ends around the axis of the shaft 30 adjacent the knuckle 32 and extending normally in horizontal directions from the shaft, the outer ends of the arms being bent upon themselves at 36 forming U-shaped sockets in which a pair of pawls 37 and 38 are pivoted. Each of these pawls has two engaging points adapted to engage with the right and left teeth of the double ratchet wheel respectively in alternation. The pivot pins for the pawls are indicated at 39. It will be noted that the point at one end of each pawl will engage with one set of teeth of the ratchet wheel, and when the pawl is shifted on its pivot the other end or point of the pawl is adapted to engage with the opposite teeth.

40 indicates a rod adapted to reciprocate vertically in and through the sleeve 32 having a head 41 swiveled at its upper end and a cross head 42 secured to its lower end. A pair of links 43 are pivoted to the ends of the cross head and at their upper ends are connected to the pivots 39 above described.

At 44 I show a bell crank mounted upon a fixed pivot 45 and having one arm connected by links 46 to the head 41. The other arm of the bell crank is pivoted at 47 to an eccentric rod 49 having an eccentric strap 50 surrounding the eccentric 15. It will be seen, therefore, that when the eccentric is adjusted to an eccentric position with respect to the driving shaft, each rotation of the shaft and eccentric will cause the bell crank 41 to oscillate, and through the links 46 will cause the rod 40 to reciprocate in the sleeve and fork supporting it. It follows, therefore, that the links 43 will cause the pawls to move up and down, one of the pawls engaging the ratchet wheel to rotate it in a certain direction and the other pawl on the opposite stroke actuating the other side of the ratchet wheel causing it to continue in the same direction. Each pawl, therefore, is so designed as to ride idly over the ratchet teeth while the opposite pawl is in driving engagement. A spring 51 coöperates with each pawl serving to hold it resiliently in engagement with the ratchet wheel.

In Fig. 5 is shown a pawl controller comprising an annular body 52 journaled upon the pivot 39 and having an arm 53 extending outwardly therefrom in one direction and having an annular spring holding arm 53' projecting outwardly in another direction to which the spring 51 is secured. The pawl controllers are adapted to be held in operative position by means of a hand wheel or disk 54 journaled concentrically of the driven shaft and having a pair of cam slots 55 formed therein. Each slot is provided with inner and outer arc-shaped portions concentric with the axis of the shaft, said portions being connected by a cam shaped portion. The slots 55 are arranged similarly to each other with respect to the cam disk, but have similar points arranged diametrically opposite each other. A pair of rods 56 are pivotally connected at 57 to the arms 53 of the controllers and have their inner ends bent at right angles and projected through the respective slots 55 as shown best in Fig. 3. The cam disk 54 is adapted to be sufficiently rotated by any suitable means to cause the rods 56 to lie in either the inner or the outer arcs of the grooves. Fig. 3 shows the arms located in the smaller arcs but upon rotation of the cam disk in a counterclockwise direction in Fig. 3, it will be noted that the rods 56 will be projected outwardly by the cam portions of the grooves so as to lie in the outer arcs and at such time the controllers will have been turned so as to cause the springs 51 to hold the opposite points of the pawls in coöperative relation with the ratchet wheel. It follows, therefore, that without changing the reciprocatory action of the rod 40 and arms connected thereto through the links 43 and cross head 42, the ratchet wheel and shaft 30 will be caused to rotate in the opposite direction. It will be seen also that the extent of rotation of the ratchet wheel due to each rotation of the driving shaft 10 through the eccentric connections and bell crank 44 will depend directly upon the amount of eccentricity of the eccentric 15.

As a suitable means to rotate the cam wheel 54 for the purpose of changing the direction of motion of the driven shaft, I connect thereto at 58 a cable, chain or other flexible connection 59, such connection running over any suitable number or location of direction pulleys 60 and is connected at a certain point, say, such as 61, to a locking lever 62 having one end pivoted at 63.

64 indicates a locking plate pivoted at 65 on the frame of the machine and having a slot 66 formed therein, one portion of which is in the form of an arc of a circle concentric with the pivot 65, and the open end of the slot is formed radially with respect to the pivot, adapting the locking lever 62 to enter the slot, and when located in the arc-shaped portion thereof the locking plate will be free to rotate around its axis under the force of the lever 29 acting in a fork 67 extending outwardly from the plate at one side, as shown in Fig. 1. The parts are so designed that the lever 62 is adapted to swing through the arc of a circle determined substantially by the distance between the arc-shaped portion of the slot 66 and the concentric rim 68 of the same locking plate. As shown furthermore in Fig. 1, for the lever 62 to be swung on its pivot so as to lie along the rim 68 or in the arc-shaped portion of the slot 66, the controlling lever 29 must be so located that the eccentric 15 will be in its idle or neutral position. When in this position the arm 62 will be free to move on its axis in either direction, causing the connection 59 to move the pawl controllers in a corresponding direction to determine the direction of rotation of the driven shaft. In other words, by the means set forth or their equivalent, it will be impossible to change the direction of rotation of the driven members without first bringing the eccentric 15 to its concentric or neutral position so as to stop the reciprocation of the rod 40.

Among the many uses of this driving mechanism may be noted the propulsion of automobiles or similar vehicles, and the design of the mechanism is such that any suitable number of eccentric driving connections may be mounted upon and operated by the same driving shaft. The driven members 30, being adapted to be adjusted to any desired angles with respect to the driving shaft, makes the apparatus well adapted for connection to the individual wheels of the vehicle. In Figs. 6 and 7, for example, is given an indication of means whereby a pair of eccentrics 15 are mounted in parallel planes and through which the shaft 10 extends as already described. The arm 25 when operated to adjust the eccentric to vary its throw causes at the same time a similar adjustment of the other eccentric of the pair but in the opposite direction by suitable means illustrated as comprising a pinion 70 mounted upon a radius arm 71 carried by the main shaft 10 and meshing with oppositely arranged arc-shaped racks 72 secured to the eccentrics 15.

At 73 I show a feather spring carried by the pivot pin 39 and so coöperating with the pawl devices as to tend to hold the pawl out of contact with the ratchet wheel. In some instances it is desirable to hold the pawls in mid or neutral position and at such time the feather springs will serve to prevent any contact between any point of the pawl and ratchet wheel. The feather spring, however, of each pawl is not so strong as to prevent the desired intermittent engagement with the ratchet wheel in the manner and for the purposes previously described.

I claim:

1. In power transmitting mechanism, the combination of a driving shaft, a driven shaft adapted to be adjusted to any desired angle with respect to the driving shaft, and intermittent grip devices between the driving and driven shafts whereby the driven shaft may be actuated from the driving shaft in either direction irrespective of the angle of adjustment thereof.

2. In power transmitting devices, the combination of driving means adapted to operate continuously in a certain direction, a driven shaft adapted to be adjusted in any desired angle with respect to the driving means, intermittent grip ratchet devices associated with the driven shaft, and actuating means between the driving means and the intermittent grip ratchet devices whereby the driven shaft may be actuated in either direction irrespective of the angle of adjustment thereof.

3. In power transmitting mechanism, the combination of a driving shaft having constant rotation in a certain direction, a driven shaft adapted to be disposed at any desired angular relation to the driving shaft, a double ratchet wheel connected to the driven shaft, a pair of pawls coöperating with the opposite sides of the ratchet wheel, a variable eccentric driven by the driving shaft, connections between the eccentric and the pawls serving to cause the pawls to rotate the ratchet wheel in proportion to the eccentricity of the eccentric, means to vary the throw of the eccentric, means to shift the pawls for reversing the direction of rotation of the driven shaft, and means connected to the pawl shifting devices and the eccentric throwing means to prevent the shifting of the pawls while the driven shaft is rotated.

4. In power transmitting mechanism, the combination of driving means, an oscillating bell crank, connections between the driving means and the bell crank to cause the oscillation thereof, a driven shaft, means associated with the driven shaft serving to mount one end thereof to adapt the shaft to be extended in any suitable direction, and pawl and ratchet mechanism between the driven shaft and said bell crank whereby the shaft will be driven in either direction from the bell crank irrespective of the angle of adjustment thereof.

5. In power transmitting mechanism, the combination of a frame having a fork at one end, a knuckle swiveled in said fork adapting it to swing in an arc of a circle therearound, a driven shaft at one end connected to said knuckle, a reciprocatory member movable longitudinally of the knuckle, pawl and ratchet means between the reciprocatory member and the driven shaft adapted to cause the driven shaft to be rotated constantly in a certain direction coincidentally with the reciprocation of said member, driving means, and connections between the driving means and said reciprocatory member serving to cause the member to reciprocate to different distances with a corresponding variation in speed of the driven shaft irrespective of the angle of adjustment of the driven shaft or rate of speed of the driving means.

6. In power transmitting mechanism, the combination of a driving shaft adapted to be operated continuously in a certain direction, a plate secured to the driving shaft and rotated thereby, an eccentric pivoted at one side to the plate and having an opening through which the shaft extends either concentrically or at any desired eccentric adjustment, means controlling the degree of eccentricity of the eccentric, a driven member, connections between the eccentric and the driven member serving to actuate the latter at various speeds according to the degree of eccentricity of the eccentric, means to reverse the direction of movement of the driven member, and interlocking means between the direction changing means and the means aforesaid for controlling the degree of eccentricity, substantially as set forth.

GLENN C. BROWN.

Witness:
GEO. L. BEELEN.